(12) United States Patent
Jang et al.

(10) Patent No.: US 7,986,662 B2
(45) Date of Patent: Jul. 26, 2011

(54) APPARATUS AND METHOD FOR REDUCING MAP CHANNEL OVERHEAD IN A BROADBAND WIRELESS COMMUNICATION SYSTEM

(75) Inventors: Jae-Hyuk Jang, Deagu (KR); Young-Bin Chang, Anyang-si (KR); Jung-Min Ro, Seoul (KR); Eun-Taek Lim, Suwon-si (KR); Dong-Seek Park, Yongin-si (KR); Young-Kwon Cho, Suwon-si (KR); Chung-Gu Kang, Seoul (KR); Il-Whan Kim, Incheon (KR)

(73) Assignees: Samsung Electronics Co., Ltd (KR); Industry-University Cooperation Foundation Sogang University (KR)

( * ) Notice: Subject to any disclaimer, the term of this patent is extended or adjusted under 35 U.S.C. 154(b) by 1254 days.

(21) Appl. No.: 11/640,623

(22) Filed: Dec. 18, 2006

(65) Prior Publication Data

US 2007/0140167 A1 Jun. 21, 2007

(30) Foreign Application Priority Data

Dec. 16, 2005 (KR) ................. 10-2005-0124278

(51) Int. Cl.
*H04W 4/00* (2009.01)
(52) U.S. Cl. ........ 370/329; 370/335; 370/445; 370/208; 375/260; 375/267; 375/299
(58) Field of Classification Search .................. 370/329, 370/330, 319, 322, 343, 344, 431, 335, 445, 370/208; 375/260, 267, 299
See application file for complete search history.

(56) References Cited

U.S. PATENT DOCUMENTS

| 2003/0185193 | A1* | 10/2003 | Choi et al. | 370/348 |
|---|---|---|---|---|
| 2005/0201325 | A1* | 9/2005 | Kang et al. | 370/328 |
| 2006/0025079 | A1* | 2/2006 | Sutskover et al. | 455/67.11 |
| 2006/0262768 | A1* | 11/2006 | Putzolu | 370/344 |
| 2007/0060050 | A1* | 3/2007 | Lee et al. | 455/13.1 |
| 2007/0064669 | A1* | 3/2007 | Classon et al. | 370/347 |
| 2007/0070905 | A1* | 3/2007 | Oliver et al. | 370/235 |
| 2007/0109995 | A1* | 5/2007 | Quigley et al. | 370/329 |
| 2008/0095223 | A1* | 4/2008 | Tong et al. | 375/228 |
| 2008/0298315 | A1* | 12/2008 | Ihm et al. | 370/329 |
| 2008/0310385 | A1* | 12/2008 | Iochi et al. | 370/345 |
| 2009/0067374 | A1* | 3/2009 | Yoon et al. | 370/329 |
| 2009/0080351 | A1* | 3/2009 | Ryu et al. | 370/312 |

FOREIGN PATENT DOCUMENTS

| KR | 1020000023124 | 4/2000 |
|---|---|---|
| KR | 1020030028352 | 4/2003 |
| KR | 1020050097726 | 10/2005 |

* cited by examiner

*Primary Examiner* — Pierre-Louis Desir
(74) *Attorney, Agent, or Firm* — The Farrell Law Firm, P.C.

(57) ABSTRACT

An apparatus and method for reducing MAP channel overhead in a broadband wireless communication system. In a Base Station (BS), a traffic classifier classifies transmission data into a first group and a second group according to user channel information and packet sizes of the transmission data. A MAP channel configure configures a MAP channel to include information about users of the first group and positions of data for the users, information indicating whether users of the second group have succeeded in random access in a second uplink data region of a previous frame, and information about resource reservation for a current frame for the second group. A channel mapper maps the first group to a first downlink data region and maps the second group to a second downlink data region according to the MAP channel.

19 Claims, 9 Drawing Sheets

APPARATUS AND METHOD FOR REDUCING MAP CHANNEL OVERHEAD IN A BROADBAND WIRELESS COMMUNICATION SYSTEM

PRIORITY

This application claims priority under 35 U.S.C. §119 to an application filed in the Korean Intellectual Property Office on Dec. 16, 2005 and assigned Ser. No. 2005-124278, the contents of which are incorporated herein by reference.

BACKGROUND OF THE INVENTION

1. Field of the Invention

The present invention relates generally to a broadband wireless communication system, and in particular, to an apparatus and method for reducing Media Access Protocol (MAP) channel overhead.

2. Description of the Related Art

Today, many wireless communication technologies have been proposed as candidates for high-speed mobile communications. Among them, Orthogonal Frequency Division Multiplexing (OFDM) is thought of as most promising for future-generation wireless communications. OFDM was adopted for Wireless Metropolitan Area Network (WMA) of Institute of Electrical and Electronics Engineers (IEEE) 802.16 standards family called the $3.5^{th}$ generation technology. OFDM is also expected to find its use in most of $4^{th}$ generation wireless communication technologies, which will be deployed by 2010.

Among the IEEE 802.16 standardization working groups, major wireless communication standards are IEEE 802.16d and 802.16e. These two standards are further branched into single carrier, OFDM, and Orthogonal Frequency Division Multiple Access (OFDMA). The IEEE 802.16d/e OFDM standards define structures of downlink and uplink frames using time-frequency resources and radio channel allocation based on radio channel status within a frame in order to effectively deliver intended digital bit information to a receiver.

A MAP channel structure complying with the OFDM standards is composed of a DownLink-MAP (DL-MAP) channel and an UpLink-MAP (UL-MAP) channel. The DL-MAP channel provides information about users to receive downlink bursts and positions of downlink bursts within a downlink frame. Downlink bursts carry actual data sent from a Base Station (BS). The UL-MAP channel provides information about users that are to send uplink bursts and positions of uplink bursts within an uplink frame. Uplink bursts carry actual data sent from users, i.e. Mobile Stations (MSs). By the UL-MAP channel, the BS indicates users to send their uplink data and positions of the uplink data in the uplink frame. A burst refers to a set of data to which the same Modulation and Coding Scheme (MCS) is applied. A downlink or uplink burst has at least one subchannel and at least one symbol. Symbols are physically arranged in order of time. For example, a $k^{th}$ symbol is followed by a $(k+1)^{th}$ symbol in time. In contrast, an $s^{th}$ subchannel may or may not be physically adjacent to an $(S+1)^{th}$ subchannel. Due to the frequency selective feature of broadband transmission, subchannels are logically rearranged so OFDM subcarriers of each subchannel are not successive physically.

As described above, the conventional IEEE 802.16 OFDMA system selects appropriate subchannels for users according to their radio channel status using a variety of subchannel allocation schemes and configures a frame by allocating data for users based on a subchannel-symbol, to thereby flexibly arrange downlink and uplink bursts in the frames. However, as the freedom of resource allocation increases, control information to be sent increases as much. Control information about positions of data to be notified to users adds to overhead of the DL-MAP and the UL-MAP channels when data for a plurality of users co-exist in one frame. Especially since all MSs have to receive the MAP information, a BS modulates and encodes the MAP channels using an MCS robust enough to allow a remotest MS to receive the MAP information. As a result, significant resources are used to send the MAP channels at the sacrifice of a size of payload carrying actual data.

SUMMARY OF THE INVENTION

An object of the present invention is to substantially solve at least the above problems and/or disadvantages and to provide at least the advantages below. Accordingly, an object of the present invention is to provide an apparatus and method for reducing MAP channel overhead in a broadband wireless communication system.

Another object of the present invention is to provide an apparatus and method for grouping users into two groups according to channel status and packet sizes of data and allocating resources to a group having at least one of poor channel status and a small packet size without using a MAP channel in a broadband wireless communication system.

A further object of the present invention is to provide an apparatus and method for allocating mini-slots to users that send data with small packet sizes and representing the mini-slots in a bitmap to reduce the information of a UL-MAP and replace MAP information sent from a BS in a broadband wireless communication system.

The above objects are achieved by providing an apparatus and method for reducing MAP channel overhead in a broadband wireless communication system are provided.

According to one aspect of the present invention, in an apparatus for transmitting and receiving data in a BS, a traffic classifier classifies transmission data into a first group and a second group according to user channel information and packet sizes of the transmission data. A MAP channel configure configures a MAP channel to include information about users of the first group and positions of data for the users, information indicating whether users of the second group have succeeded in random access in a second uplink data region of a previous frame, and information about resource reservation for a current frame for the second group. A channel mapper maps the first group to a first downlink data region and maps the second group to a second downlink data region according to the MAP channel.

According to another aspect of the present invention, in an apparatus for transmitting and receiving data in an MS in a broadband wireless communication system, a data region selector selects a first uplink data region for transmission when the MS is in good channel status and transmission data is of a large size, and selects a second uplink data region for transmission when the MS has at least one of poor channel status and the transmission data is of a small size. A channel configure maps the transmission data at a data transmission position indicated by MAP information received from a BS in the first uplink data region when the first uplink data region is selected. The data region selector selects an unreserved transmission block in the second uplink data region based on resource reservation bitmap information for a current frame set in the MAP information when the second uplink data region is selected, performs a random access by sending the transmission data in the selected transmission block, is allocated a transmission block from the BS, and maps transmission data to the allocated transmission block in the second uplink data region. A channel information storage collects channel information and provides the channel information to the data region selector.

According to a further aspect of the present invention, in a method of transmitting data in an MS in a broadband wireless communication system, a current uplink channel status and packet size of the uplink data are determined upon generation of uplink data. The uplink data is mapped to a transmission position indicated by MAP information received from a BS in a first uplink data region and sent at the transmission position in the first uplink data region when the channel status is good and the packet size is large. An unreserved transmission block is selected from a second uplink data region based on a resource reservation bitmap for a current frame, set in the MAP information, a random access is performed by sending the uplink data in the selected transmission block to the BS, and a transmission block is allocated from the BS when the channel status is at least one of poor and a packet size is small. The uplink data is sent in the allocated transmission block of the second uplink data region upon generation of uplink data.

According to still another aspect of the present invention, in a method of receiving data in an MS in a broadband wireless communication system, a determination is made whether a first downlink data region includes data destined for the MS by MAP information upon receipt of downlink data. In presence of data destined for the MS in the first downlink data region, a position of the data is detected. A determination is made whether a second downlink data region includes data destined for the MS by checking headers of data in the second downlink data region in absence of data destined for the MS in the first downlink data region. The position of the data is detected in presence of data destined for the MS in the second downlink data region. A determination is made whether data sent in the second uplink data region in a previous frame has been successfully received Based on bitmap information set in the MAP information. Then, the data destined for the MS is extracted from the downlink data according to the detected position.

According to yet another aspect of the present invention, in a method of transmitting data in a BS in a broadband wireless communication system, downlink data are classified into a first group and a second group according to user channel information and packet sizes of the downlink data upon generation of downlink data. The first group is in good channel status and has a large packet size and the second group has at least one of poor channel status and a small packet size. A MAP channel is configured to include information about users of the first group and positions of data for the users, a slot reservation bitmap for users of the second group, and an ARQ bitmap indicating whether the users of the second group have succeeded in random access in a previous frame. Based on the MAP channel, the first group is mapped to a first downlink data region, and the second group is mapped to a second downlink data region according to MCS levels of the users of the second group.

According to yet further aspect of the present invention, a frame structure is comprised of a first downlink data region, a first uplink data region, a second downlink data region, a second uplink data region, and a MAP channel in a broadband wireless communication system. The first downlink and uplink data regions are allocated to users of a first group in good channel status and having a large packet size. The second downlink and uplink data regions are allocated to users of a second group having at least one of poor channel status and a small packet size. The MAP channel includes information about users of the first group and positions of data for the users of the first group, and a bitmap indicating resource reservation for a current frame for users of the second group and indicating whether the users of the second group have succeeded in random access in a previous frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for reducing MAP channel overhead in a broadband wireless communication system. According to the present invention, users are grouped into two groups according to a predetermined criterion, for example, according to their channel status and service types. By a single MAP channel, a Base Station (BS) allocates resources to users in a good channel status and using services with large-size data (hereinafter, referred to as "first group") by a MAP channel, and allocates resources to users in poor channel status or users using services with small-size data like Voice over Internet Protocol (VoIP) (hereinafter, referred to as "second group"), as compared to a conventional frame structure with a DownLink-MAP (DL-MAP) channel and an UpLink-MAP (UL-MAP) channel. Therefore, overhead of the MAP channel is reduced. The criterion for identifying whether a channel status is good or poor, and the size of data is large or small can be set in many known ways.

Figure 1:
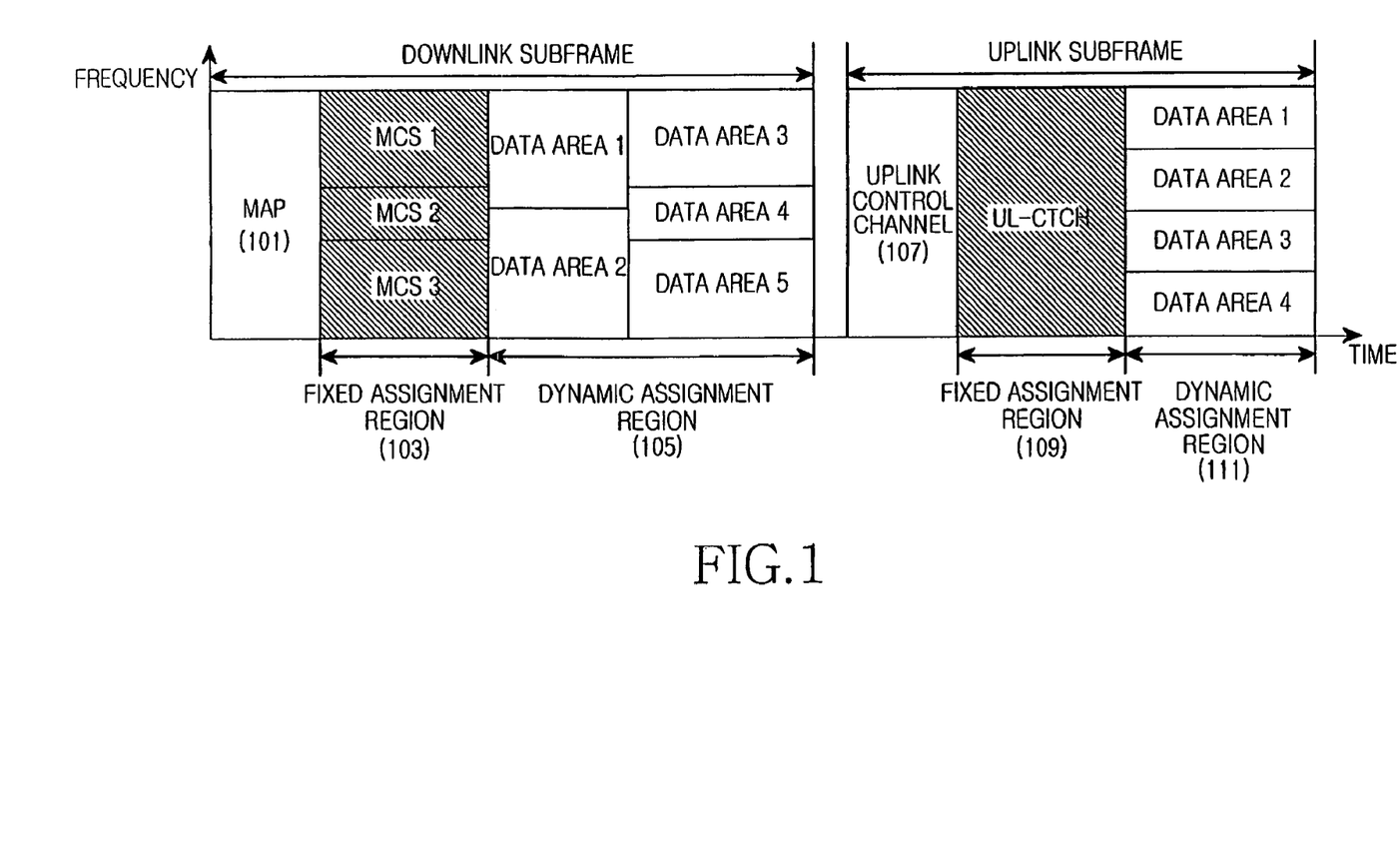
FIG. 1 illustrates a frame structure in a Time Division Duplex/Orthogonal Frequency Division Multiple Access (TDD/OFDMA) system according to the present invention.

FIG. 1 shows a frame structure in a Time Division Duplex/Orthogonal Frequency Division Multiple Access (TDD/OFDMA) system according to the present invention. A frame is comprised of a MAP channel 101 carrying information indicating positions of allocated downlink and uplink resources, downlink bursts 103 and 105 carrying downlink data, uplink bursts 109 and 111 carrying uplink data, and an uplink control channel 107. The downlink bursts 103 and 105 are divided into a fixed assignment region (or second downlink data region) 103 and a dynamic assignment region (or first downlink data region) 105, and the uplink bursts 109 and 111 are divided into a fixed assignment region (or second uplink data region) 109 and a dynamic assignment region (or first uplink data region) 111.

The dynamic assignment regions 105 and 111 are allocated to the first group, i.e. users in good channel status and with a large packet size, and the BS allocates resources to the first group by the MAP channel 101. Since the MAP channel 101 does not need a very robust Modulation and Coding Scheme (MCS) for the users of the first group, the BS sends the MAP channel 101 using appropriate MCS levels for the respective users. Upon receipt of the MAP channel 101, the users respectively decode it using their appropriate MCS levels.

The fixed assignment regions 103 and 109 are allocated to the second group, i.e. users in poor channel status or users using services with a small data size, such as VoIP. The BS does not use another MAP channel for resource allocation to them. Instead, the BS distinguishes users by means of the Medium Access Control (MAC) headers of actual data and applies robust MCS levels to the data including the MAC headers.

Figure 2:
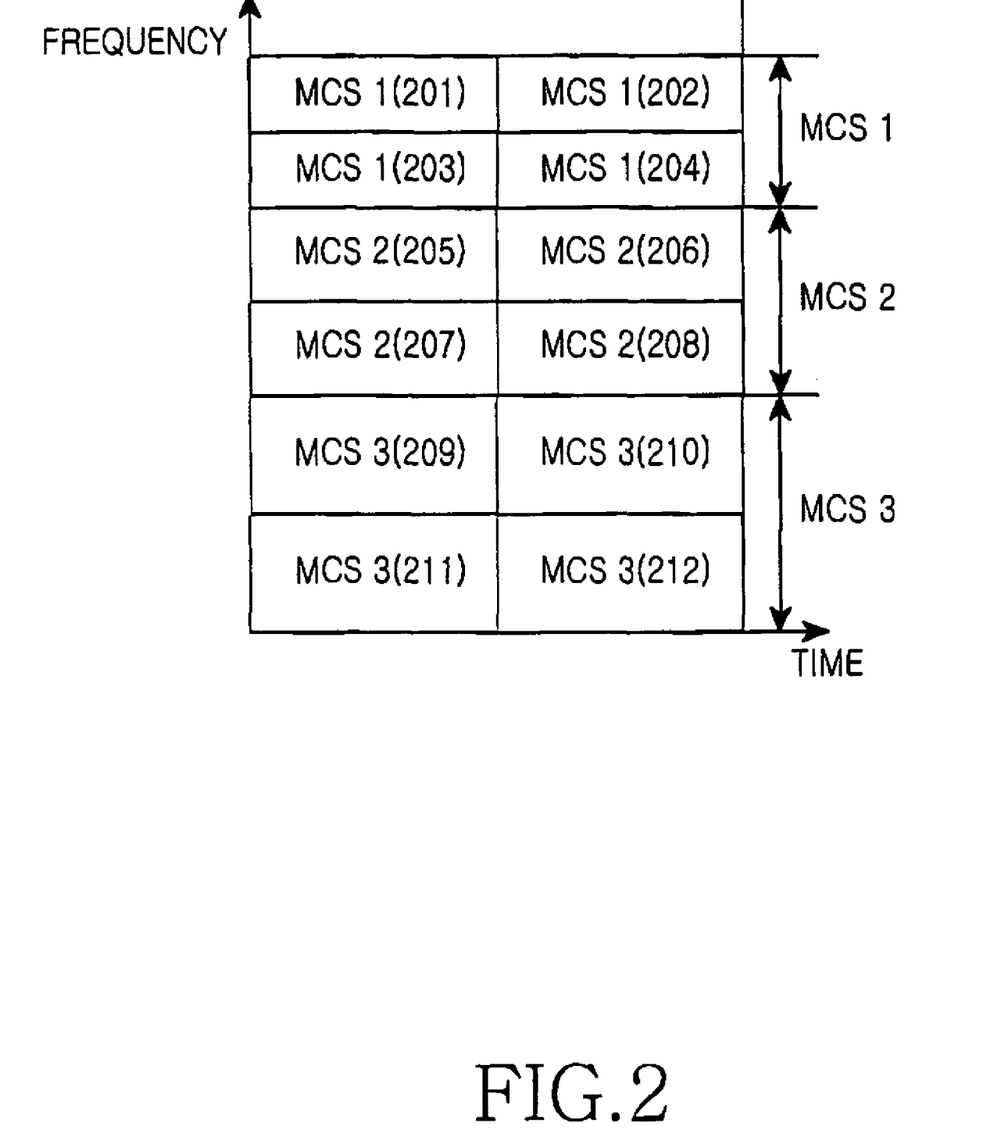
FIG. 2 illustrates the structure of a fixed assignment region in an uplink sub-frame according to the present invention.

The fixed assignment regions 103 and 109 each are divided into a predetermined number of parts according to MCS levels, for example, three parts (MCS 1, MCS 2 and MCS 3). It may occur that a plurality of users use the same MCS level in the fixed assignment region 109 of an uplink sub-frame. Thus, a plurality of blocks with the same MCS level exist as shown in FIG. 2. Each of blocks 201 to 212 in the fixed assignment region 109 is available to one user and the number and layout of the blocks vary depending on a frame length. In FIG. 2, the fixed assignment region 109 of FIG. 1 has four blocks for each of three MCS levels and thus up to 12 users send the blocks 201 to 212. The sizes and positions of the fixed assignment regions 103 and 109 of the downlink and uplink sub-frames may be determined fixedly during system design, or may be periodically changed by a broadcast system information message, for example, IEEE 802.16 Downlink Channel Descriptor/Uplink Channel Descriptor (DCD/UCD).

The uplink control channel 107 is used for random access for ranging and resource allocation, channel information feedback, and transmission of Automatic Repeat request (ARQ) information.

The MAP channel 101 provides information about users associated with downlink and uplink bursts in the first group, information about positions of the bursts in the frame (i.e. UL-MAP and DL MAP), and bitmaps for the second group.

Figure 3:
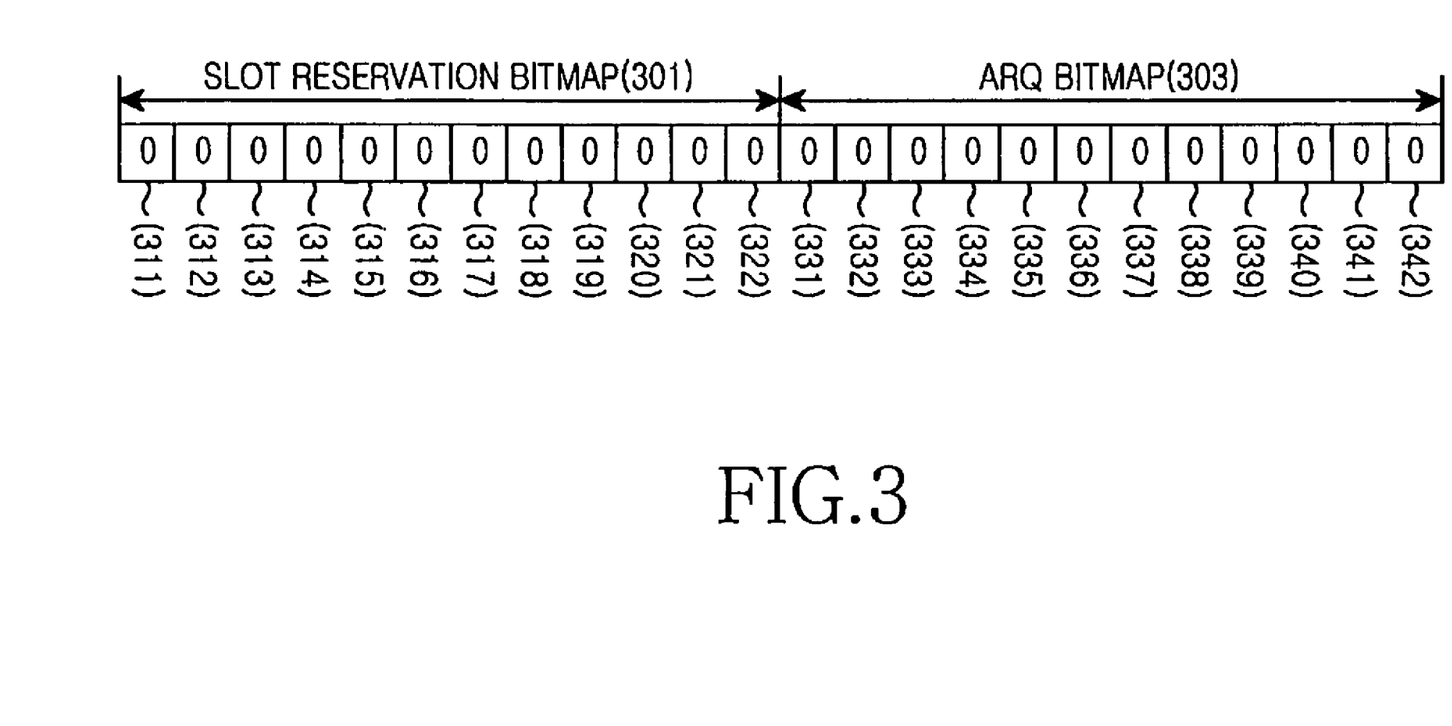
FIG. 3 illustrates the structure of a bitmap set in a MAP channel according to the present invention.

The bitmaps are a slot reservation bitmap 301 and an ARQ bitmap 303. The lengths of the bitmaps 301 and 303 vary with the number of blocks included in the fixed assignment region 109 of the uplink sub-frame. Thus, the total number of bits for the bitmaps 301 and 303 is twice the number of the blocks, far less than the amount of data in the conventional MAP channel. The slot reservation bitmap 301 is a bitmap representing a resource reservation made in a previous frame. Mobile Stations (MSs) refer to the slot reservation bitmap 301 when they attempt to send packets in the fixed assignment region 109. The ARQ bitmap 303 indicates whether blocks sent in the fixed assignment region 109 of the previous frame by the MSs have been received successfully in the BS. If the BS flags a bit corresponding to a block sent by an MS to 1 on the MAP channel, this implies that the BS has received the block successfully. As shown in FIG. 3, the BS flags a $7^{th}$ bit 337 to 1 in the ARQ bitmap 303 on the MAP channel when a user selects a $7^{th}$ block 207 shown in FIG. 2 and sends a packet in the block 207 in the previous frame. Subsequently, the BS reserves the block 207 for the MS all the time every period negotiated by messages exchanged with the MS during session opening, for example, IEEE 802.16 Dynamic Service Deletion-REQuest (DSD-REQ) and Dynamic Service Deletion-ReSPonse (DSD-RSP) messages and flags the bit 317 of the slot reservation bitmap 301 to 1 on the MAP channel to prevent other users from sending packets in the reserved block 207 until the session ends. The bit 317 is flagged to 1 in $N^{th}$ and $(N+4x)^{th}$ frames (x is a positive integer) when packets are created every four frames. Therefore, when finding out that particular bits of the slot reservation bitmap 301 are flagged to 1s, other users do not attempt to send packets in the blocks corresponding to the flagged bits, thereby avoiding collision. The session can be released by exchanging messages between the BS and the MS, for example, the IEEE 802.16 DSD-REQ and DSD-RSP messages.

Figure 4:
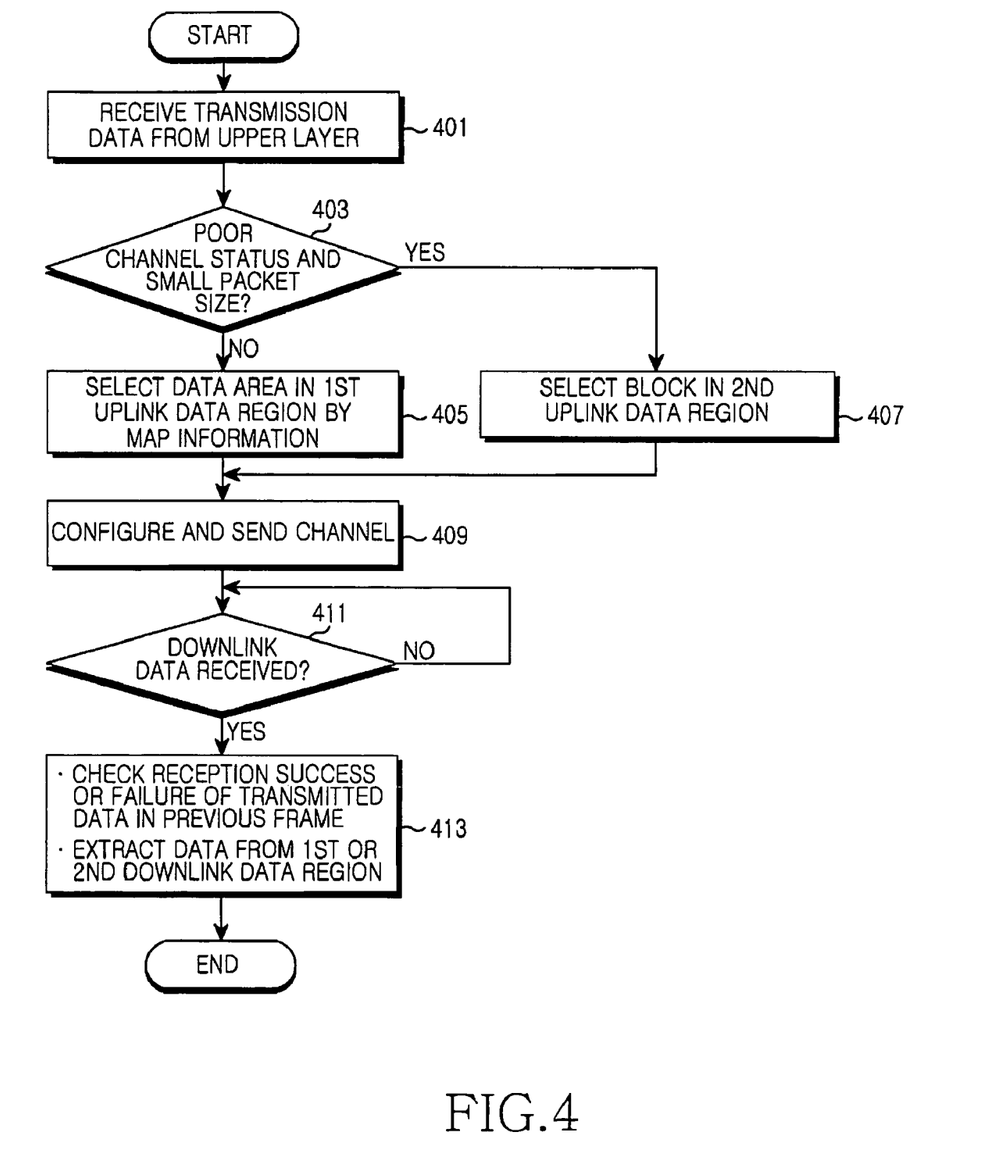
FIG. 4 is a flowchart illustrating a transmission and reception operation of an MS in a broadband wireless communication system according to the present invention.

FIG. 4 shows a transmission and reception operation of an MS in a broadband wireless communication system according to the present invention. The MS receives uplink data to be sent to the BS from an upper layer in step 401. In step 403, the MS estimates its uplink channel status by a pilot signal or a preamble received from the BS and determines whether the uplink data is of a small packet size.

The MS selects an available data transmission block in the second uplink data region 109 according to its MCS level based on information about allocated resources for a current frame in step 407 when the uplink channel status is poor or when the uplink data has a small packet size. The MS then configures a channel by mapping the data to the selected data transmission block and sends the data in step 409. The information about the reserved resources is acquired from the slot reservation bitmap 301 set in the MAP channel 101. The MS can negotiate a slot reservation period by exchanging messages, for example, the IEEE 802.16 DSD-REQ and DSD-RSP messages with the BS so the selected block is reserved every slot reservation period until a session is released.

On the other hand, an MS requests resource allocation to the BS when the status of the uplink channel of the MS is good and the MS has large-size data, is allocated resources by MAP information received in response to the resource allocation request from the BS, and selects the allocated transmission area in the first uplink data region 111 in step 405. In step 409, the MS configures a channel by mapping the data to the allocated data transmission area and sends the data.

In step 411, the MS monitors receipt of downlink data. Upon receipt of the downlink data, the MS determines by the MAP information whether the first downlink data region 105 has data destined for the MS and in the presence of data, the MS extracts the data from a position indicated by the MAP information in the downlink data in step 413. In the absence of data destined for the MS in the first downlink data region 105, the MS extracts data from the second downlink data region 103 by checking MAC headers in step 413. Also, an MS checks the ARQ bitmap 303 of the MAP channel 101 to decide whether the data has been successfully received in the BS in step 413 when the MS sent uplink data sent in the second data region 109 in the previous frame. Then the MS ends the process of the present invention.

Figure 5:
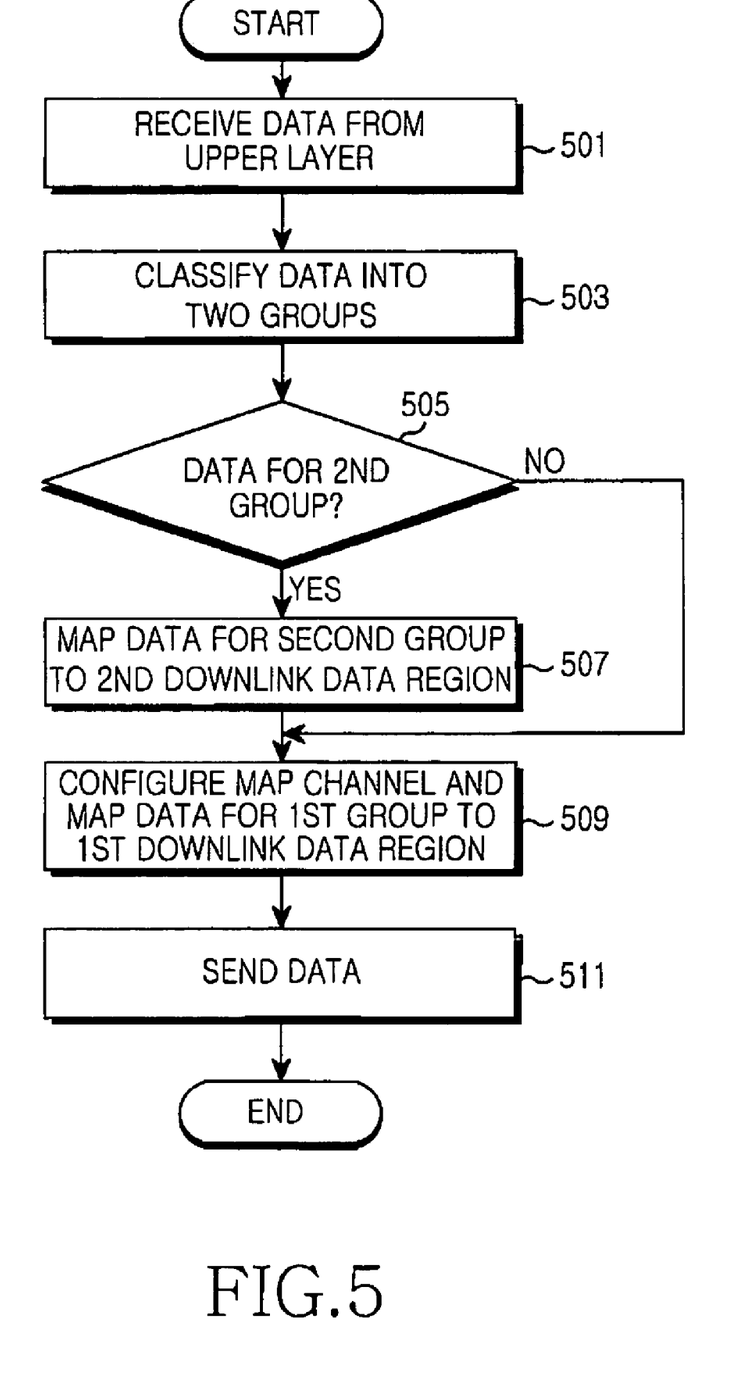
FIG. 5 is a flowchart illustrating a transmission and reception operation of a BS in the broadband wireless communication system according to the present invention.

FIG. 5 shows a transmission and reception operation of the BS in the broadband wireless communication system according to the present invention. The BS receives downlink data to be set to one or more MSs from an upper layer in step 501. In step 503, the BS groups the MSs into two groups according to their packet sizes and user channel information. Specifically, one group (the first group) is in good channel status and has data of a large size, whereas the other group (the second group) is in poor channel status or receives a service with a small packet size like VoIP.

In step 505, the BS determines whether the downlink data includes data destined for the second group. In the absence of data for the second group, the BS jumps to step 509. In step 509, the BS maps data for the first group to the first downlink data region 105 and configures a MAP channel with information about users of the first group and positions of the data.

In the presence of data for the second group, the BS maps data for the second group to the second downlink data region 103 according to their MCS levels in step 507 and maps the data for the first group to the first downlink data region 105 and configures the MAP channel to include information about users of the first group and positions of the data and a slot reservation bitmap and an ARQ bitmap for the second group. In step 511, the BS sends the data and ends the process of the present invention.

Figure 6:
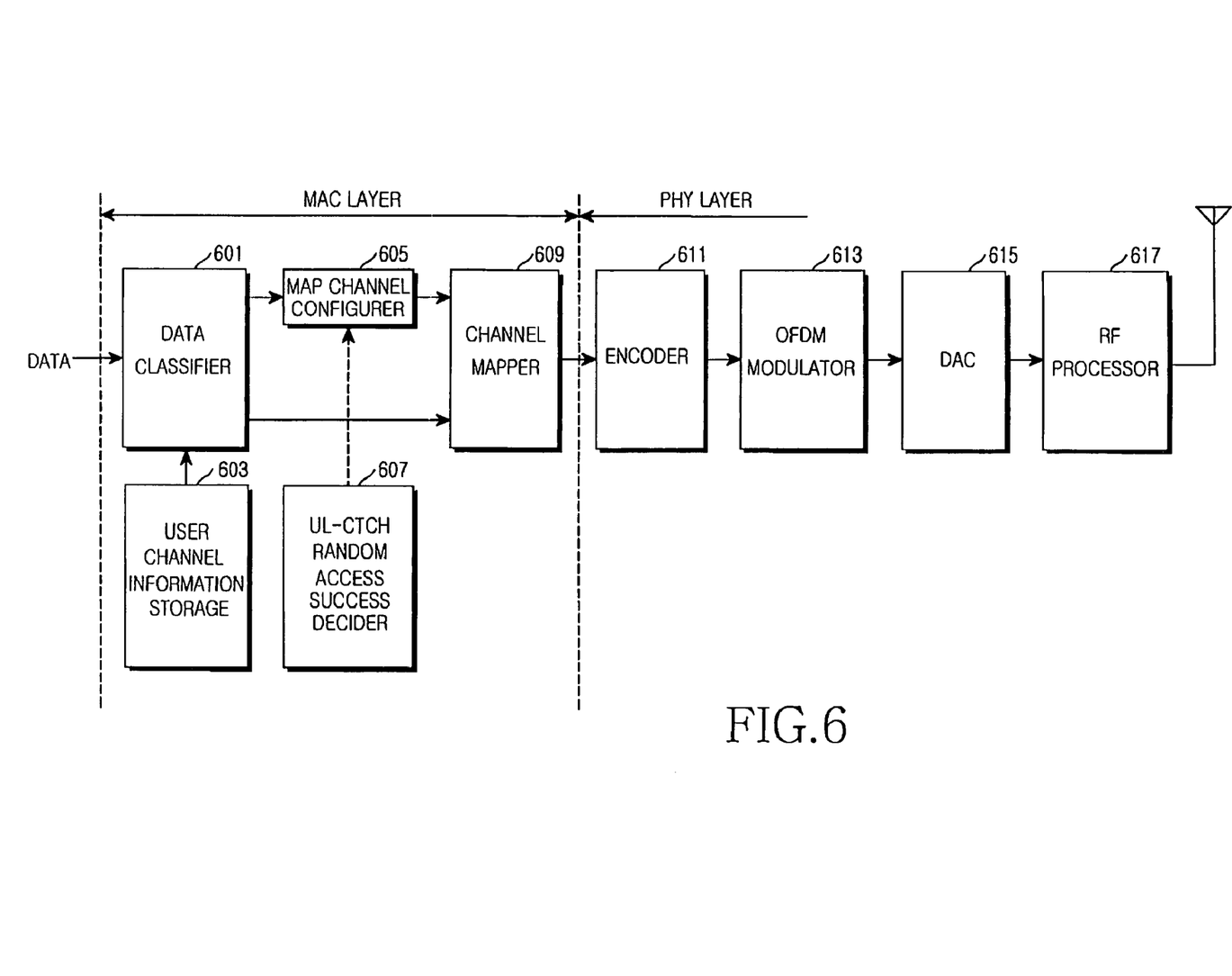
FIG. 6 is a block diagram of a transmitter in the BS according to the present invention.

FIG. 6 shows a transmitter in the BS according to the present invention. The BS includes a data classifier 601, a user channel information storage 603, a MAP channel configure 605, an UpLink-Common Traffic Channel (UL-CTCH) random access success decider 607, a channel mapper 609, an encoder 611, an OFDM modulator 613, a Digital-to-Analog Converter (DAC) 615, and a Radio Frequency (RF) processor 617.

In operation, the data classifier 601 classifies traffic data received from a backbone into two groups according to packet types of the traffic data (e.g. packet sizes) and user channel information received from the user channel information storage 603. To be more specific, the data classifier 601 classifies the traffic data into the first group in good channel status and having a large packet size and the second group in poor channel status or having a small packet size like VoIP. The user channel information storage 603 stores the user channel information.

The MAP channel configure 605 receives information about the traffic data grouping from the data classifier 601, and information indicating whether the second group has succeeded in random access and information about resource reservation in the current frame for the second group from the UL-CTCH random access success decider 607 when the second group attempted random access by sending data in the second uplink data region 109 in the previous frame. Based on the received information, the MAP channel configure 605 configures a MAP channel to include information about users of the first group and positions of the data for the first group and a slot reservation bitmap and an ARQ bitmap for the second group. The UL-CTCH random access success decider 607 determines whether packets sent in the previous uplink frame by users of the second group have been successfully received.

The channel mapper 609 maps the MAP channel and the traffic data of the first and second groups according to a frame structure.

The encoder 611 encodes and modulates the traffic data predetermined MCS levels. The OFDM modulator 613 OFDM-modulates the coded traffic and the DAC 615 converts the modulated signal to an analog signal. The RF processor 617 wirelessly sends the analog signal in a carrier frequency.

Figure 7:
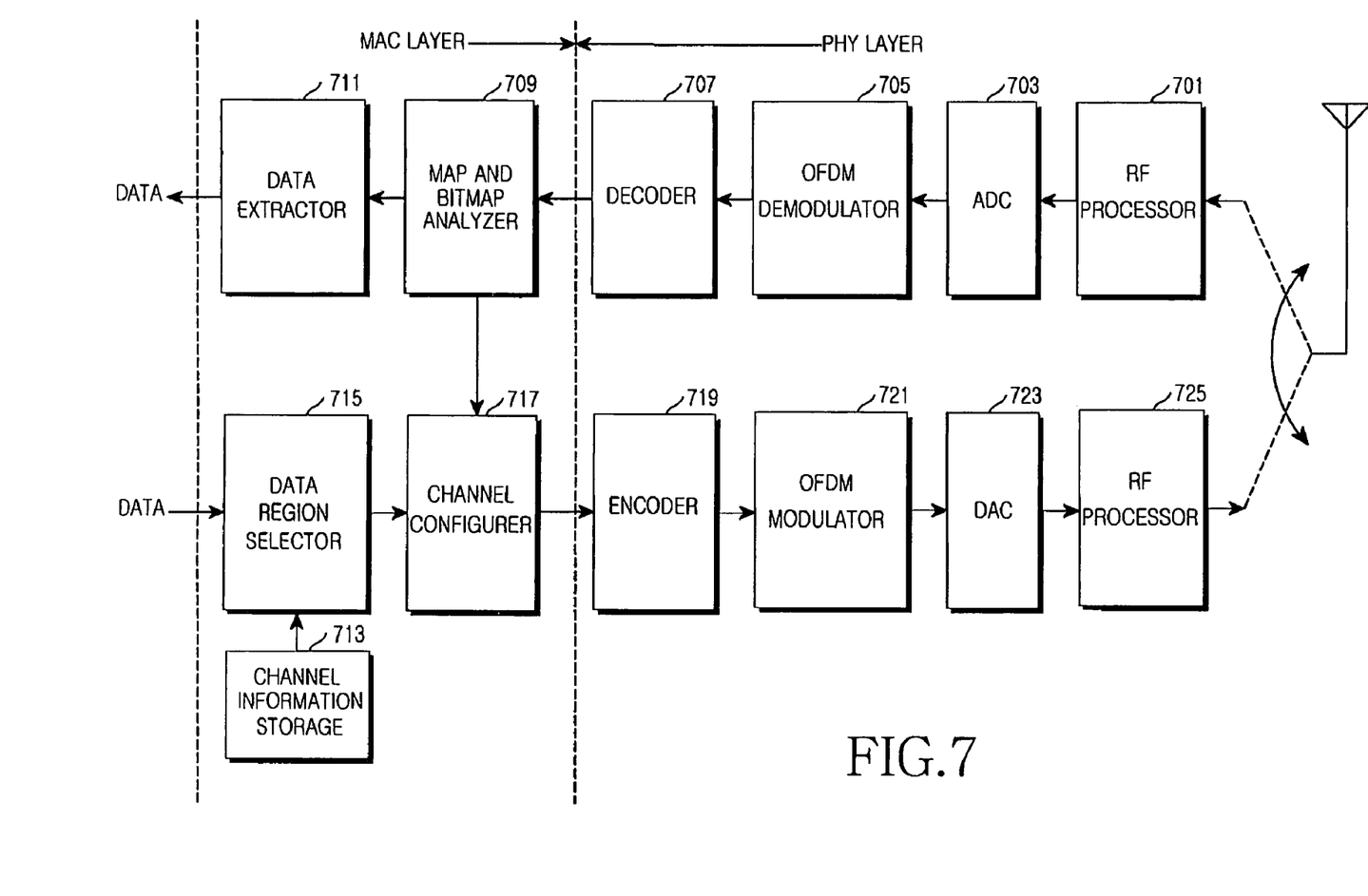
FIG. 7 is a block diagram of a transmitter and receiver in the MS according to the present invention.

FIG. 7 shows a transmitter and receiver in the MS according to the present invention. The receiver of the MS includes an RF processor 701, an Analog-to-Digital Converter (ADC) 703, an OFDM demodulator 705, a decoder 707, a MAP and bitmap analyzer 709, and a data extractor 711. The transmitter of the MS includes a channel information storage 713, a data region selector 715, a channel configure 717, an encoder 719, an OFDM modulator 721, a DAC 723, and an RF processor 725.

For reception, the RF processor 701 downconverts a downlink RF signal to a baseband signal and the ADC 703 converts the analog baseband signal to a digital signal. The OFDM demodulator 705 OFDM-demodulates the digital signal and the decoder 707 decodes the demodulated signal at a given MCS level.

The MAP and bitmap analyzer 709 extracts MAP information from the decoded signal, detects position of data destined for the MS, and determines whether data sent in the previous frame on the UL-CTCH has been successfully received in the BS and checks resource reservation for the current frame according to bitmap information included in the MAP information. The downlink data and position of the data destined for the MS are provided to the data extractor 711 and the resource reservation information is provided to the channel configure 717.

The data extractor 711 extracts data from the received downlink data based on position information and provides extracted data to an upper layer.

For transmission, the channel information storage 713 collects channel information using a pilot signal or a preamble and provides the channel information to the data region selector 715.

The data region selector 715 receives transmission data from the upper layer and selects a data region for the transmission data according to the received channel information and the traffic type of the transmission data. The data region can be the fixed assignment region 109 or the dynamic assignment region 111. The data region selector 715 selects the fixed assignment region 109 in poor channel status or when the transmission data has a small packet size like VoIP. The data region selector 715 selects the dynamic assignment region 111 when the channel status of the MS is good and when the MS has a large packet size.

The channel configurer 717 configures a channel by mapping the transmission data to the selected data region. The MS requests resource allocation and is allocated a transmission position by a UL-MAP from the BS for the dynamic assignment region 111 shown in FIG. 1. Thus, the channel configure 717 maps the transmission data to the allocated transmission position. On the other hand, the channel configure 717 selects any of available blocks in the fixed assignment region 109 according to the MCS level of the MS according to the resource reservation information for the current frame and maps the transmission data to the selected block for the fixed assignment region 109. Once a block is selected, the block can be allocated every reservation period, which has been negotiated. From then on, data can always be mapped to the position of the block without selecting an available block in the fixed assignment region 109 using resource reservation information.

The encoder 719 encodes the mapped traffic data at the MCS level and the OFDM modulator 721 OFDM-modulates the coded data. The DAC 723 converts the modulated digital signal to an analog signal and the RF processor 725 wirelessly sends the analog signal in a carrier frequency.

Figure 8:
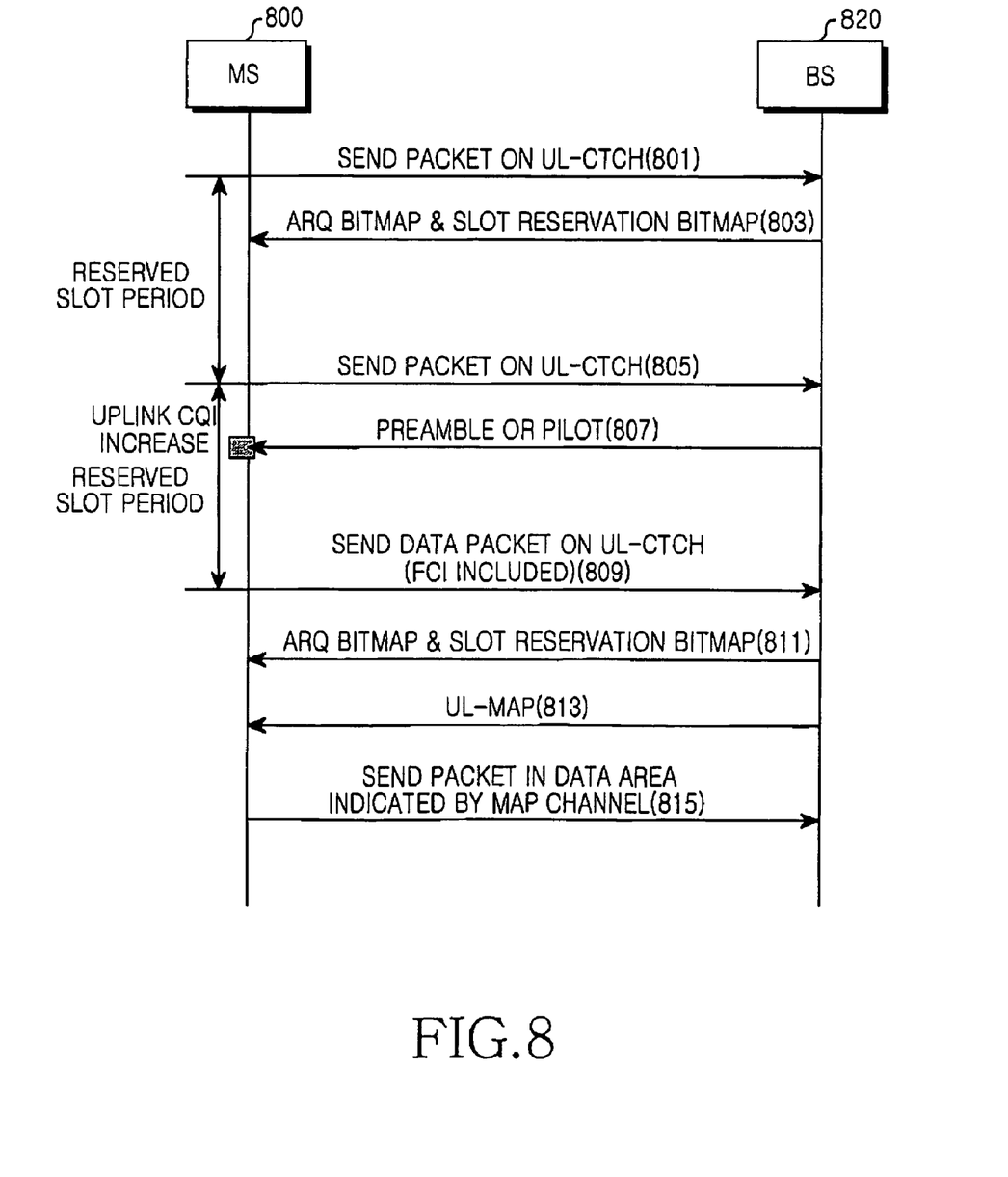
FIG. 8 is a diagram illustrating a signal flow for an operation for switching a transmission position from a fixed assignment region to a dynamic assignment region in an uplink sub-frame in the broadband wireless communication system according to the present invention.
Figure 9:
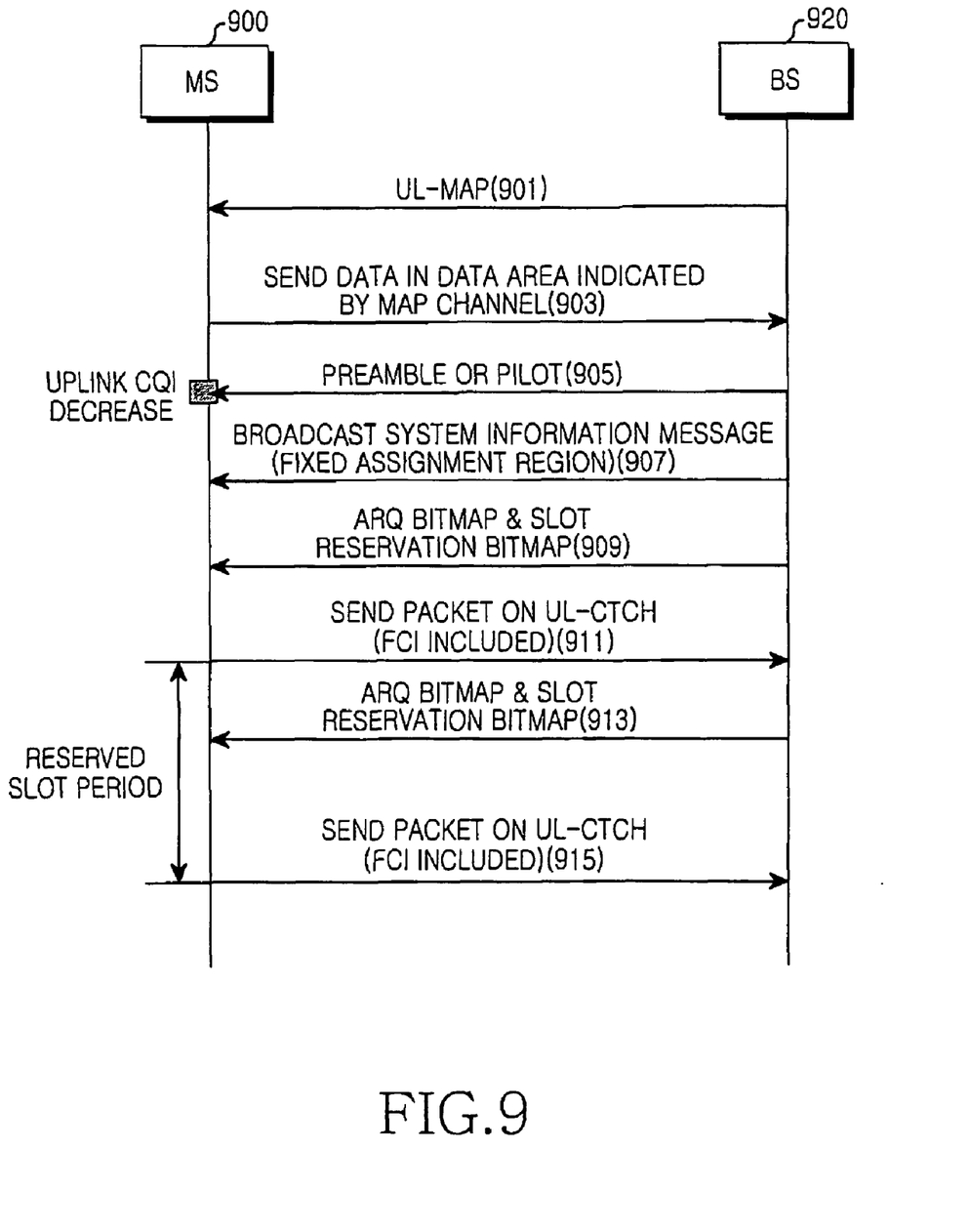
FIG. 9 is a diagram illustrating a signal flow for an operation for switching a transmission position from the dynamic assignment region to the fixed assignment region in the uplink sub-frame in the broadband wireless communication system according to the present invention.

FIGS. 8 and 9 shows a signal flow for an operation for switching a transmission position from a fixed assignment region to a dynamic assignment region and a signal flow for an operation for switching a transmission position from the dynamic assignment region to the fixed assignment region in the uplink sub-frame in the broadband wireless communication system according to the present invention. Each MS can switch data regions according to channel status and packet size by flagging a Frame Change Indicator (FCI) in the header of transmission data.

Referring to FIG. 8, an MS 800 sends data in the fixed assignment region 109, i.e. on the UL-CTCH of an $(N-1)^{th}$ uplink subframe to a BS 820 in step 801. In step 803, the MS 800 determines whether the data sent in the $(N-1)^{th}$ uplink subframe has been successfully received in the BS based on an ARQ bitmap set in the MAP channel of an $N^{th}$ frame and checks reserved resources for the $N^{th}$ frame based on a slot reservation bitmap set in the MAP channel. Typically, the MS opens a session by exchanging messages including the traffic characteristic and ID of the session with the BS, for example, IEEE 802.16 DSA-REQ and DSA-RSP messages. During the message exchange, the MS can negotiate the use of the fixed assignment region 109 and a packet creation period of 20 msec for traffic, such as VoIP according to a COder/DECoder (CODEC) with the BS. Once a session is opened, a service like VoIP is characterized by periodic packet creation. Hence, the BS can reserve resources for the MS periodically when initial uplink data is successfully received from the MS.

After waiting for a reserved slot, the MS 800 sends transmission data on the UL-CTCH 109 at a corresponding slot timing in step 805. The MS 800 sends a packet with an FCI flagged to 1 in its header on the UL-CTCH 109 to the BS 820, thus notifying that a data packet will be sent in the dynamic assignment region 111 of which the allocation is indicated by the MAP channel in step 809 when the MS 800 is aware from a preamble or pilot signal received from the GBS 820 that the uplink channel status becomes better in step 807.

The MS 800 determines from the ARQ bitmap 303 received in an $(N+1)^{th}$ frame whether the data sent in the $N^{th}$ frame has been successfully received in the BS in step 811 and is allocated a data transmission position by the UL-MAP 101 in the $(N+1)^{th}$ frame in step 813. The MS 800 sends a data packet in the dynamic assignment region 111 of the $(N+_1)^{th}$ frame according to the MAP channel 101 in step 815.

Referring to FIG. 9, an MS 900 is allocated a data transmission position by the UL-MAP 101 in step 901 and sends a data packet at the allocated position in the dynamic assignment region 111 to a BS 920 in step 903. Typically, the MS opens a session by exchanging messages including the traffic characteristic and ID of the session with the BS, for example, IEEE 802.16 DSD-REQ and DSD-RSP messages. Once a session is opened, a service like VoIP is characterized by periodic packet creation. Hence, the BS can reserve resources for the MS periodically when initial uplink data is successfully received from the MS. When the MS 900 detects from a preamble or a pilot signal received from the BS 920 that the uplink channel status becomes poor in step 905, the MS 900 checks the position of the fixed assignment region 109 by a broadcast system information message received from the BS 920 in step 907 and selects an empty block according to its MCS level referring to the slot reservation bitmap 301 received from the BS 920 in step 909. The broadcast system information message may be received before the preamble or pilot signal.

In step 911, the MS sends a data packet with an FCI flagged to 1 in its header in the selected block to the BS 920, notifying the BS 920 that the MS has transitioned to the UL-CTCH 109. In step 913, the MS 900 receives the AR bitmap 303 and the slot reservation bitmap 301 and determines whether the data packet sent on the UL-CTCH in the previous frame has been successfully received in the BS 920 and checks resources reserved for the current frame. The MS 900 then is allocated the resources from the BS 920 every transmission period, i.e. every slot reservation period and sends packets on the UL-CTCH in step 915.

In accordance with the present invention as described above, in a broadband wireless communication system, downlink/uplink traffic data are grouped into two groups according to channel status and packet size. Data of a first group in good channel status and having a large packet size is sent by allocating resources by a MAP channel, whereas data of a second group in poor channel status or having a small packet size is sent by allocating resources by a bitmap in the MAP channel. Therefore, the MAP information of the MAP channel is reduced, saving resources and reducing downlink MAP channel overhead. Also, an MS attempts random access by sending uplink data is sent in a specific block and is notified whether the random access is successful by feedback information. Hence, a resource request procedure is simplified, compared to a conventional resource request procedure of, for example, IEEE 802.16 using a bandwidth request code or message for resource allocation. Once the MS succeeds in the random access, periodic resource allocation is guaranteed to the MS and that with a bitmap. Thus, there is no need for an additional random access and MAP overhead is remarkably reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for transmitting and receiving data in a broadband wireless communication system, the apparatus comprising:
 a Base Station (BS), wherein the BS comprises:
  a user channel information storage;
  a traffic classifier for classifying transmission data into a first group and a second group according to user channel information and packet sizes of the transmission data received from the user channel information storage;
  a MAP channel configurer for configuring a MAP channel to include information about users of the first group and positions of data for users, information indicating whether users of the second group have succeeded in a random access in a second uplink data region of a previous frame, and information about resource reservation for a current frame for the second group; and
  a channel mapper for mapping the first group to a first downlink data region and mapping the second group to a second downlink data region according to the MAP channel.

2. The apparatus of claim 1, further comprising a random access success decider for determining whether packets sent by users of the second group in the second uplink data region of the previous frame have been successfully received.

3. The apparatus of claim 1, wherein each of the second downlink and uplink data regions is divided into at least one area according to Modulation and Coding Scheme (MCS) levels, each area using a different MCS level.

4. The apparatus of claim 3, wherein the second uplink data region includes at least one area using a same MCS level.

5. An apparatus for transmitting and receiving data in a broadband wireless communication system, the apparatus comprising:

a Mobile Station, wherein the MS comprises:
- a data region selector for selecting a first uplink data region for transmission when the MS is in good channel status and transmission data is of a large size according to a preset criterion, and selecting a second uplink data region for transmission when the MS has at least one of poor channel status and transmission data is of a small size according to the preset criterion;
- a channel configurer for mapping the transmission data at a data transmission position indicated by MAP information received from a Base Station (BS) in the first uplink data region when the first uplink data region is selected, and selecting an unreserved transmission block in the second uplink data region based on resource reservation bitmap information for a current frame set in the MAP information when the second uplink data region is selected, performing a random access by sending the transmission data in the selected transmission block, being allocated a transmission block from the BS, and mapping transmission data to the allocated transmission block in the second uplink data region; and
- a channel information storage for collecting channel information and providing the channel information to the data region selector.

6. The apparatus of claim 5, further comprising:

a MAP and bitmap analyzer for determining whether a first downlink data region includes data destined for the MS by the MAP information upon receipt of downlink data from the BS, detecting the position of the data in a presence of the data destined for the MS in the first downlink data region, determining whether a second downlink data region includes data destined for the MS by checking headers of data in the second downlink data region, in an absence of data destined for the MS in the first downlink data region, detecting the position of the data in a presence of data destined for the MS in the second downlink data region, notifying a data extractor of the detected position, detecting, from bitmap information set in the MAP information, information indicating whether data sent in the second uplink data region in a previous frame has been successfully received and the resource reservation information for the current frame, and providing the resource reservation information to the channel configurer; and the data extractor for extracting the data destined for the MS from the downlink data according to the detected position and sending the extracted data to an upper layer.

7. The apparatus of claim 5, wherein the second uplink data region is divided into at least one area according to Modulation and Coding Scheme (MCS) levels, each area using a different MCS level.

8. The apparatus of claim 7, wherein the second uplink data region includes at least one area using the same MCS level.

9. A method of transmitting data in a Mobile Station (MS) in a broadband wireless communication system, the method comprising the steps of:

determining, by the MS, a current uplink channel status and packet size of uplink data upon generation of uplink data;

mapping, by the MS, the uplink data to a transmission position indicated by MAP information received from a Base Station (BS) in a first uplink data region and sending, from the MS, the uplink data at the transmission position in the first uplink data region when the channel status is good and the packet size is large; and selecting by the MS, an unreserved transmission block in a second uplink data region based on a resource reservation bitmap for a current frame, set in the MAP information, performing a random access by sending the uplink data in the selected transmission block from the MS to the BS, being allocated a transmission block at the MS from the BS, mapping, upon generation of uplink data, the uplink data to the allocated transmission block in the second uplink data region upon generation of uplink data, and sending the uplink data from the MS when the channel status is poor or the packet size is small.

10. The method of claim 9, further comprising requesting resource allocation to the BS and being allocated resources by the MAP information received from the BS when the channel status is good and the packet size is large.

11. The method of claim 9, further comprising negotiating a slot reservation period by exchanging messages with the BS when at least one of the channel status is poor and the packet status is small.

12. The method of claim 11, wherein the messages are Dynamic Service Deletion-REQuest (DSA-REQ) and Dynamic Service Deletion-ReSPonse (DSA-RSP) messages.

13. The method of claim 9, wherein the second uplink data region is divided into at least one area according to Modulation and Coding Scheme (MCS) levels, each area using a different MCS level.

14. The method of claim 13, wherein the second uplink data region includes at least one area using the same MCS level.

15. The method of claim 9, further comprising notifying the BS that the data region will be changed from the current frame on by changing a frame change indicator in the header of the data and sending uplink data in the second uplink data region when the channel status becomes poor during the data transmission in the first uplink data region.

16. The method of claim 9, further comprising notifying the BS that the data region will be changed in a next frame by changing a frame change indicator in a header of the data and sending uplink data in the first uplink data region when the channel status becomes good during the data transmission in the second uplink data region.

17. A method of transmitting data in a Base Station (BS) in a broadband wireless communication system, the method comprising the steps of:

classifying, by the BS, downlink data into a first group and a second group according to user channel information and packet sizes of the downlink data, the first group being in good channel status and having a large packet size and the second group has at least one of poor channel status and a small packet size upon generation of downlink data;

configuring, by the BS, a MAP channel to include information about users of the first group and positions of data for users, a slot reservation bitmap for users of the second group, and an Automatic Repeat reQuest (ARQ) bitmap indicating whether the users of the second group have succeeded in random access in a previous frame; and mapping, by the BS, the first group to a first downlink data region and mapping the second group to a second downlink data region according to Modulation and Coding scheme (MCS) levels of the users of the second group based on the MAP channel.

18. A method of receiving data in a Mobile Station (MS) in a broadband wireless communication system, the method comprising the steps of:
- determining, by the MS, whether a first downlink data region includes data destined for the MS by MAP information upon receipt of downlink data;
- detecting, by the MS, a position of the data in presence of the data destined for the MS in the first downlink data region;
- determining, by the MS, whether a second downlink data region includes data destined for the MS by checking headers of data in the second downlink data region, in absence of data destined for the MS in the first downlink data region;
- detecting, by the MS, a position of the data in presence of data destined for the MS in the second downlink data region;
- determining, by MS, from bitmap information set in the MAP information whether data sent in the second uplink data region in a previous frame has been successfully received; and
- extracting, by the MS, the data destined for the MS from the downlink data according to the detected position.

19. The method of claim 18, wherein the second uplink data region is divided into at least one area according to Modulation and Coding Scheme (MCS) levels, each area using a different MCS level.

* * * * *